(12) United States Patent
Inman

(10) Patent No.: US 6,568,291 B1
(45) Date of Patent: May 27, 2003

(54) SHAFTLESS GYROSTABILIZER

(76) Inventor: William E. Inman, 4274 Old A1A S., Palm Coast, FL (US) 32137

( * ) Notice: Subject to any disclaimer, the term of this patent is extended or adjusted under 35 U.S.C. 154(b) by 5 days.

(21) Appl. No.: 09/680,495

(22) Filed: Oct. 5, 2000

(51) Int. Cl.$^7$ .......................... G01C 19/02; F16F 15/22; B64G 1/28

(52) U.S. Cl. ........................ 74/5.34; 74/573 R; 244/165

(58) Field of Search ..................... 74/5.22, 5.7, 5.46, 74/5 R, 845, 86, 87, 573 R, 574; 114/121, 122, 124; 244/79, 165

(56) References Cited

U.S. PATENT DOCUMENTS

| | | | | |
|---|---|---|---|---|
| 769,693 A | * | 8/1904 | Forbes | 74/5.22 |
| 2,577,942 A | * | 12/1951 | Agins | 74/5 R |
| 2,822,225 A | * | 2/1958 | Teufel | 74/5 R |
| 2,871,707 A | | 2/1959 | Kupier | 74/5.22 |
| 3,006,581 A | * | 10/1961 | Langman | 74/5.37 X |
| 3,048,108 A | * | 8/1962 | Roberson et al. | 244/165 |
| 3,158,340 A | | 11/1964 | Sellers | 244/79 |
| 3,193,216 A | | 7/1965 | Fischel | 244/14 |
| 3,226,982 A | | 1/1966 | Betts | 74/5.6 |
| 3,237,457 A | * | 3/1966 | Luber | 74/5 R |
| 3,336,810 A | * | 8/1967 | Schaffer et al. | 74/5 R |
| 3,365,596 A | * | 1/1968 | Jones | 74/5 R |
| 3,365,959 A | * | 1/1968 | Quermann | 74/5 R |
| 3,410,143 A | | 11/1968 | Bowles | 74/5.6 |
| 3,424,401 A | | 1/1969 | Maurer | 244/1 |
| 3,498,476 A | | 3/1970 | Mattson et al. | 214/1 |
| 3,509,778 A | | 5/1970 | Bowles | 74/5.6 |
| 3,540,289 A | | 11/1970 | Ivers | 73/505 |
| 3,662,608 A | * | 5/1972 | Vold | 74/5 |
| 3,726,146 A | * | 4/1973 | Mishler | 74/5 |
| 3,733,923 A | * | 5/1973 | Goodrich et al. | 74/573 |
| 3,822,602 A | * | 7/1974 | Holmes et al. | 74/5 R |
| 3,927,329 A | * | 12/1975 | Fawcett et al. | 290/1 |
| 4,014,280 A | * | 3/1977 | Laxo | 114/124 |
| 4,150,579 A | | 4/1979 | Vaughn | 74/5 R |
| 4,364,106 A | * | 12/1982 | Lam | 362/272 |
| 4,669,323 A | | 6/1987 | Hojo et al. | 74/5.44 |
| 4,674,356 A | | 6/1987 | Kilgore | 74/573 R |
| 4,891,997 A | * | 1/1990 | Hayashi | 74/5.46 |
| 4,905,776 A | | 3/1990 | Beynet et al. | 175/56 |
| 4,951,514 A | * | 8/1990 | Gubin | 74/5 R |
| 5,349,915 A | * | 9/1994 | Thomas et al. | 114/124 |
| 5,582,381 A | * | 12/1996 | Graf et al. | 248/430 |
| 5,605,078 A | | 2/1997 | Taylor et al. | 74/573 R |
| 5,768,951 A | | 6/1998 | Hannah et al. | 74/573 R |
| 5,829,318 A | | 11/1998 | Hannah et al. | 74/573 F |
| 5,839,386 A | * | 11/1998 | Frieling et al. | 74/5.22 X |
| 5,857,360 A | * | 1/1999 | Kim et al. | 74/573 R |
| 5,871,249 A | * | 2/1999 | Williams | 74/5.34 X |
| 5,941,113 A | | 8/1999 | Wierzba et al. | 74/573 F |
| 5,966,986 A | * | 10/1999 | Laul | 74/84 R |

* cited by examiner

Primary Examiner—Rodney H. Bonck
Assistant Examiner—Roger Pang
(74) Attorney, Agent, or Firm—Brian S. Steinberger; Law Office of Brian S. Steinberger, P.A.

(57) ABSTRACT

A gyrostabilizer without a physical shaft or axle is constructed. The stabilizer has dual counter-revolving concentric rings filled with weights such as spherical balls that are propelled in orbital fashion by fluid pressure or electromagnet propulsion. The diameter of the concentric ring can vary from a few inches to more than ten (10) feet. Without an axle or shaft the weight of the gyrostabilizer is shifted to the perimeter where most of the momentum is generated at a fraction of the weight of gyrostabilizers that spin on an axle. Also without an axle or shaft the space between the center of revolution and the revolving balls is usable or void. When properly mounted in a vehicle or structure unsteadiness such as tremors, vibrations, sway, pitch, roll, yaw can be dampened.

6 Claims, 13 Drawing Sheets

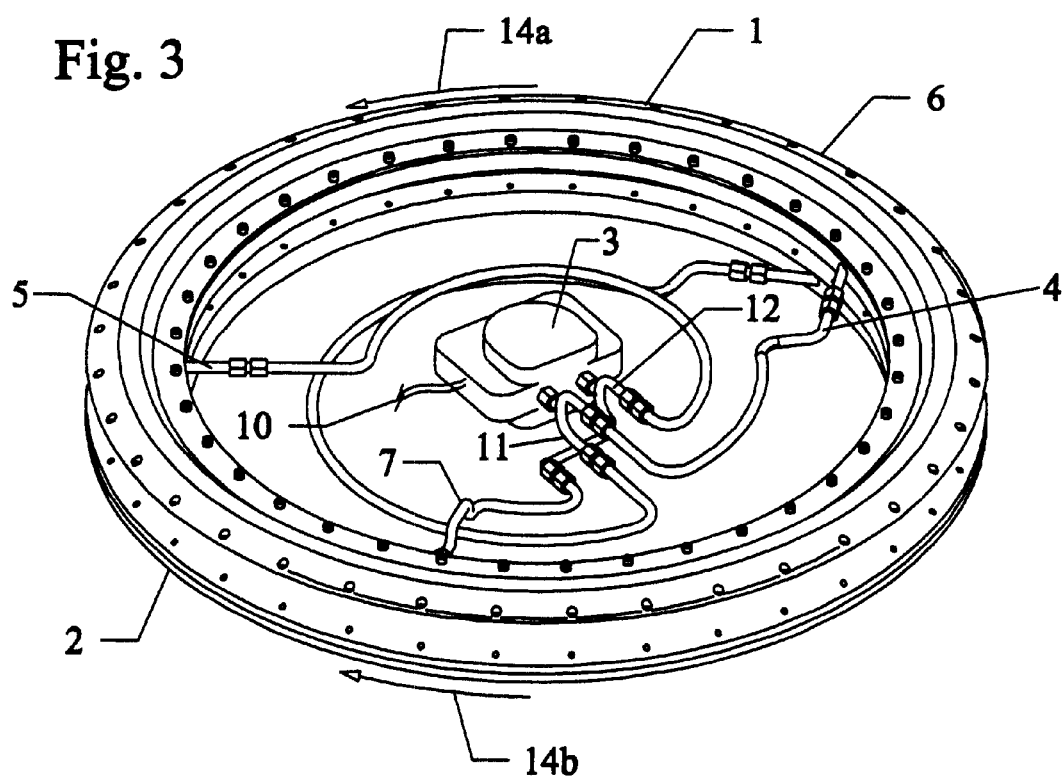
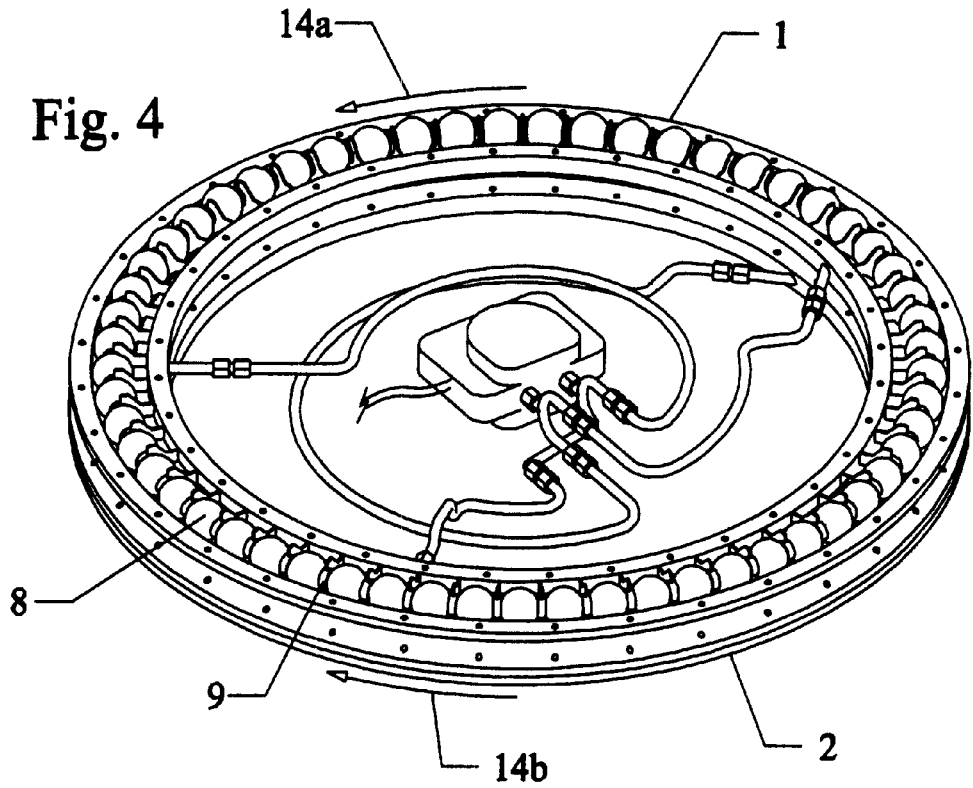

SHAFTLESS GYROSTABILIZER

This invention relates to gyrostabilizers, and in particular to a method and apparatus for stabilizing vehicles and other structures moving in different directions. The gyrostabilizers of the present invention are designed to dampen tremors, vibrations, swaying, pitching, rolling, yawing or other unsteadiness in vehicles and objects that have no other inherent means for self-stabilization.

BACKGROUND AND PRIOR ART

Counter-rotating or oppositely spinning discs mounted on centrally located shafts or axles are known to be used as stabilizers for guided missiles in U.S. Pat. No. 3,193,216; for rotation control of a space vehicle in U.S. Pat. No. 3,424, 401; and to suppress oscillation about an axis of a loaded crane in U.S. Pat. No. 3,498,476. In U.S. Pat. No. 3,540,289 a device having flat annular or circular rotors of magnetic material in a rigid frame is used to anchor a body subject to attitude change. Typical types of gyroscopes known to the subject inventor include for example U.S. Pat. Nos. 2,872, 707 to Kuiper; 3,158,340 to Sellers; 3,226,982 to Betts; 3,410,143 to Bowles; 3,509,778 to Bowles; and 4,150,579 to Vaughn. The devices identified above occupy valuable space and add considerable weight to the body that is being stabilized.

The disadvantages of the oppositely spinning discs arise from the requirement that they be physically mounted to a centrally located shaft or axle; thereby causing the entire disc to rotate and adding considerably more weight and surface area to the stabilizing device. Another disadvantage is that the centrally located axle or shaft restricts that space for other uses and finally the disc, axle or shaft arrangement limits the total revolutions per minute for discs due to wear and fatigue of the parts.

The disadvantages of the weight involved in spinning an entire disc have been addressed as follows. In U.S. Pat. No. 4,669,323, an attitude correction device is mounted above a gyro rotor and utilizes the flow of a viscous liquid and the rotation of one ball. U.S. Pat. No. 4,674,356 discloses a counter-balancing device having a discoid body with a circumferential ring of balls in a lubricating and damping fluid functioning to reduce vibrations and uneven bearing wear associated with unbalanced rotating members; the emphasis is on counter-balancing and not gyrostabilizing. According to U.S. Pat. No. 4,905,776 vibrational dampening for a drilling assembly is accomplished with races or tracks of tungsten-carbide balls in a fluid medium attached to the axial support rotating a drill bit. In a series of patents assigned to ETI Technologies, Inc. (U.S. Pat. Nos. 5,605, 078; 5,768,951; 5,829,318; and 5,941,133) balancer and vibration removing devices are disclosed which employ balls, cylindrical weights, disc-like weights and viscous fluids moving freely inside a housing with an annular groove, called a "race." All of the above spinning or rotating devices are arguably of less weight than a solid disc surface, but they all require mounting on a shaft or axle for rotation. Thus, the use restriction on the area in which the device is rotating remains a disadvantage. In addition, there are limits on the size of the stabilizing device based on space available within each application.

Further improvements in gyroscopic stabilizers are desired.

SUMMARY OF THE INVENTION

The first objective of the present invention is to provide a counter-revolving stabilizer.

The second objective of the present invention is to provide a counter-revolving stabilizer with no physically mountable axle or shaft requirement.

The third objective of the present invention is to provide a gyrostabilizer having less mass than a disk.

The fourth objective of the present invention is to provide a gyrostabilizer that requires less space than a disk.

The fifth objective of the present invention is to provide a gyrostabilizer that produces more controllable revolutions per minute than a disk.

The sixth objective of the present invention is to provide a dual counter-revolving gyrostabilizer that permits independent control of each gyro.

The seventh objective of the present invention is to offset gyroscopic precession and double the effect of angular momentum available from a single gyro.

The eighth objective of the present invention is to provide a gyrostabilizer that can be retrofitted to function in many existing vehicles and structures.

A preferred embodiment of the present invention is a design wherein a race or track contains balls propelled in a circular motion via fluid pressure or electromagnetic propulsion in an arrangement where there is no center shaft or axle. This arrangement shifts the weight of the gyrostabilizer to the perimeter where most of the momentum is created. Thus, greater momentum can be generated at a fraction of the weight of gyrostabilizers that spin on an axis. Also, the space between the center of revolution and the revolving weights is usable or void space for vehicles or structures that are weight sensitive. The absence of a physical shaft or axle also provides unlimited flexibility in sizing the stabilizing device, such that the device can be scaled to fit very large or very small vehicles and structures, including toys.

Further objects and advantages of this invention will be apparent from the following detailed description of a presently preferred embodiment that is illustrated schematically in the accompanying drawings.

BRIEF DESCRIPTION OF THE FIGURES

FIG. 3 is a perspective view of the gyrostabilizer having the fluid pump centrally located.

FIG. 4 is a view of the gyrostabilizer with the top cover of the race removed.

DESCRIPTION OF THE PREFERRED EMBODIMENT

Figure 1:
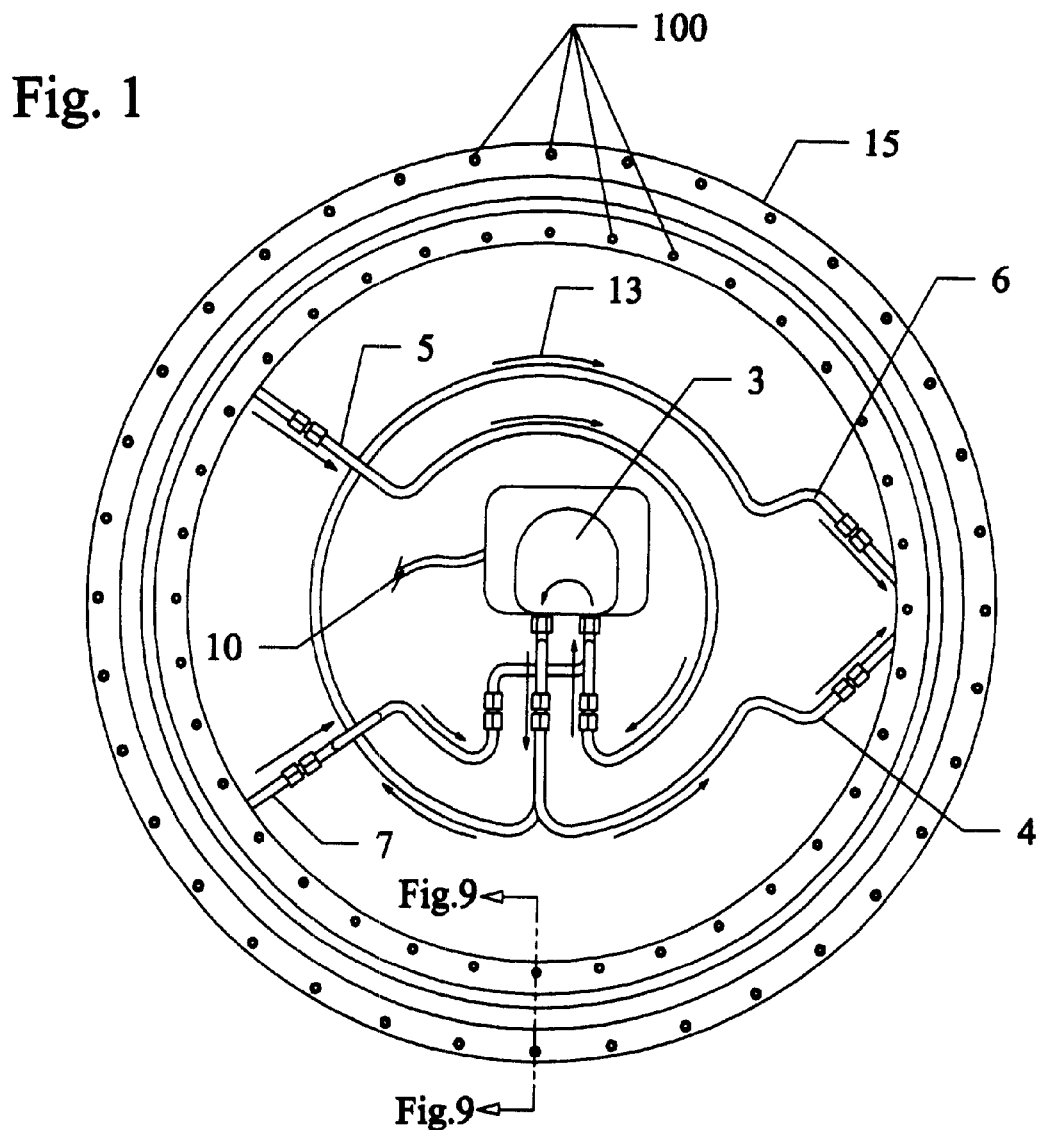
FIG. 1 is a top view of a fluid driven gyrostabilizer.

A Before explaining the disclosed embodiment of the present invention in detail, it is to be understood that the invention is not limited in its application to the details of the particular arrangement shown since the invention is capable of other embodiments, including, but not limited to, machines such a camera mount on boats and helicopters. Also, the terminology used herein is for the purpose of description and not of limitation.

The term "race" is used interchangeably with track or groove to mean a circular or annular cavity in which are placed movable weights, usually spherical and made of metal or metal alloys. The term "revolving" is used herein to mean to cause to go round in an orbit which is in contrast to the term "rotate" meaning to turn about an axis or a physical shaft or axle.

In the preferred embodiment of the present invention, weights such as metal balls are rotatably inserted in a track and are separated by vanes which minimize hydraulic resistance to movement of the weights and provide a surface area against which a fluid is directed to propel the track of rotating balls in a circular motion, known herein as revolving. The vanes also hold each spacer in place and direct the balls in the direction of fluid flow. In order to create a stabilizing device, two circular tracks are used in a stacked arrangement, such that the counter-revolving effects of the balls in their respective tracks assist in stabilizing vehicles and structures moving in different directions.

The circular race or track is formed of a durable, lightweight composite material such as, carbon fiber or a lightweight metal alloy. In a preferred embodiment, the two circular tracks of the present gyrostabilizer are bolted together in a stacked arrangement with a gasket or other suitable packing material between the upper and lower track.

The rotating weights that are propelled by a fluid can be any spherical balls made of noncorrosive materials such as silicon-nitride, dense polymers or metallic alloys such as tungsten-carbide, and the like. The weights may be one-piece discs or rings having a spherical shape to reduce friction during rotation or spinning within the track. The vanes, also sometimes called "spacer vanes," separate each ball in the track and can be made from the same durable, lightweight composite material as the track. Thus, carbon fiber or a lightweight metal alloy may be used in the fabrication of the vanes.

The fluid used to propel the track of balls can be any synthetic or petroleum-based, high pressure, hydraulic fluid. Likewise, any viscous, lubricating and noise dampening, non-flammable oil, water or air, may be used as a fluid propellant. The pump that is used to propel the fluid into the track can be any suitable pressure pump and can be located in any convenient location within the vehicle or structure that is being stabilized. Such a pump is manufactured by Hi-Speco Corporation and is identified as an engine driven hydraulic pressure pump.

When the materials described above are assembled as shown in the detailed description that follows, a method of stabilizing vehicles and structures is possible. A first set of balls is rotated in a first circular track in a first direction. A second set of balls is rotated in a second circular track in a second direction that is opposite to the first direction, simultaneous to the first set of balls wherein counter-revolving effects of the first and second set of balls assist in dampening pitch and roll when the gyro is revolving perpendicularly to the pull of gravity and parallel to the direction of unsteady movement. In addition, the counter-revolving gyrostabilizer of this invention can be used to dampen yaw if it is positioned at right angles to the pull of gravity. In zero gravity, the gyrostabilizer maintains an object in a stationary position.

A second embodiment of the present invention consists of a first circular track having a first set of balls that are alternatingly made of ferrous and non-ferrous material. The first circular track is adjacently stacked on a second circular track having a second set of balls that are also alternatingly made of ferrous and non-ferrous material. In combination with the first and,second circular tracks is a means for moving the first and second track in opposite, counter-revolving directions by electromagnetic propulsion. Electrified magnets are positioned in an efficient and symmetrical pattern on both the first and second circular tracks. When power is applied, the magnets attract the ferrous balls in the desired direction and with a controllable speed to accomplish stabilization of a vehicle or structure which may be subject to vibrations, pitching, yawing, rolling, swaying and the like.

The ferrous balls of the second embodiment are by definition largely comprised of iron or an iron alloy. Steel is a suitable material because of its strength and durability. The non-ferrous balls can be formed of ceramic material or a non-ferrous alloy such as silicon nitride. The nonferrous balls are preferably of the same density as the ferrous balls.

The diameter of the gyrostabilizer of the present invention can range from a few inches for a flying toy, to over ten (10) feet in diameter for larger structures. The rate of revolution can be in the range from 100 to 1,000 revolutions per minute (rpm). In the preferred embodiment wherein a fluid pressure pump is used to propel the gyrostabilizer, an oil pressure pump manufactured by Hi-Speco Corporation can produce pressure in a range from 1500 to 3000 pounds per square inch (psi). Specifications for the pump are dependent on the size of the gyro.

In case of an emergency, the gyrostabilizer can be shut down by reversing the direction of fluid flow or by reversing the direction of electromagnetic propulsion. Also, when mounting the gyrostabilizer in a vehicle or structure, rubber bushings are used to attach the stabilizer in a manner similar to the mounting of an engine in an automobile. The stabilizer is positioned symmetrically and centrally to the center of gravity of the area in which stability is desired.

Referring to the drawings in more detail:

The reference numeral 1 when shown in each Figure designates a first circular track having a first set of balls. Reference numeral 2 when shown in each Figure designates a second circular track having a second set of balls. In addition, the track structures 1 and 2 include a top race 15 and a bottom race 16 which is joined to form an annular groove filled with circumferentially movable weights 8. According to the present invention, at least a pair of the track structures 1 and 2 are installed in vehicles, machines and structures either perpendicular to or parallel to direction of the force that causes unsteady movement. Ideally, a gyrostabilizer is centered and placed symmetrically in the area of unsteady movement.

In FIG. 1 a top view of the gyrostabilizer shows a first track 1 positioned directly above a counter-revolving track (not shown). The fastening means 100 are shown around the inside and outside perimeter of the top race 15 and when attached to the bottom race (not shown) it forms a cavity that contains the rotating and revolving weights of the stabilizer. An oil pressure pump 3 is positioned inside the circular track 1 and forces oil simultaneously into the upper gyro drive line 4 and a lower gyro drive line 6. The oil flow direction 13 is indicated by arrows along each pipeline. The oil pressure which can range between 1,500 and 3,000 psi, causes the balls inside the upper track to rotate and turn in a first direction before the oil enters an upper gyro return line 5 while the balls inside the lower track rotate and turn in a second direction before the oil enters return line 7. In this manner the oil is re-circulated to the pump to provide continuous propulsion of balls in the two tracks in a counter-revolving direction. A power source 10 is connected to the pump 3.

Figure 2:
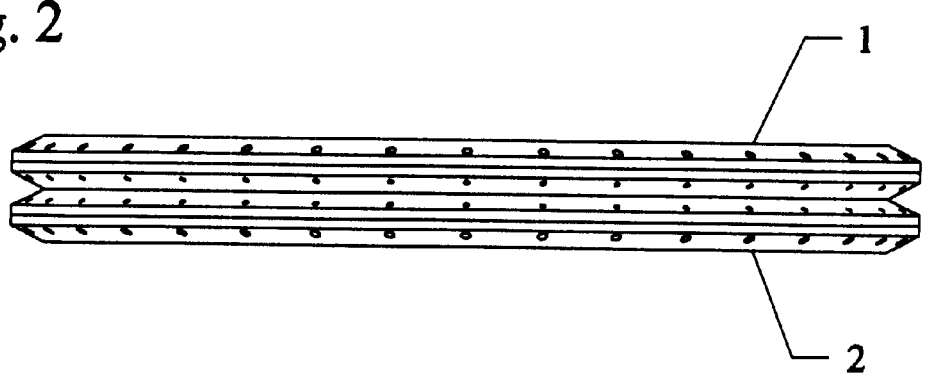
FIG. 2 is a side view of the races or tracks of the gyrostabilizer.

In FIG. 2 a side view of the upper gyro assembly 1 is shown in a stacked arrangement with the lower gyro assembly 2. FIG. 3 is a perspective view of the gyrostabilizer showing the first track 1 and the second track 2 with the fluid pressure pump 3 centrally located among the gyro drive lines 4 and 6 and the return lines 5 and 7. More detail is shown with the "Y" connector 11 which connects the upper and lower drive lines and the "Y" connector 12 which connects the upper and lower return lines to support simultaneous revolutions and recycling of fluid. The power connection 10 for the pump is shown. The counter revolving direction of the balls is indicated as 14a and 14b.

FIG. 4 provides a view of the gyrostabilizer with the top cover of the first track 1 removed. Each steel ball 8 is separated by a spacer vane 9 in a manner that efficiently and completely fills the track thereby placing the maximum weight on the perimeter of the gyrostabilizer. Counter revolving movement of balls in the first track 1 and second track 2 is shown by arrows 14a and 14b.

Figure 5:
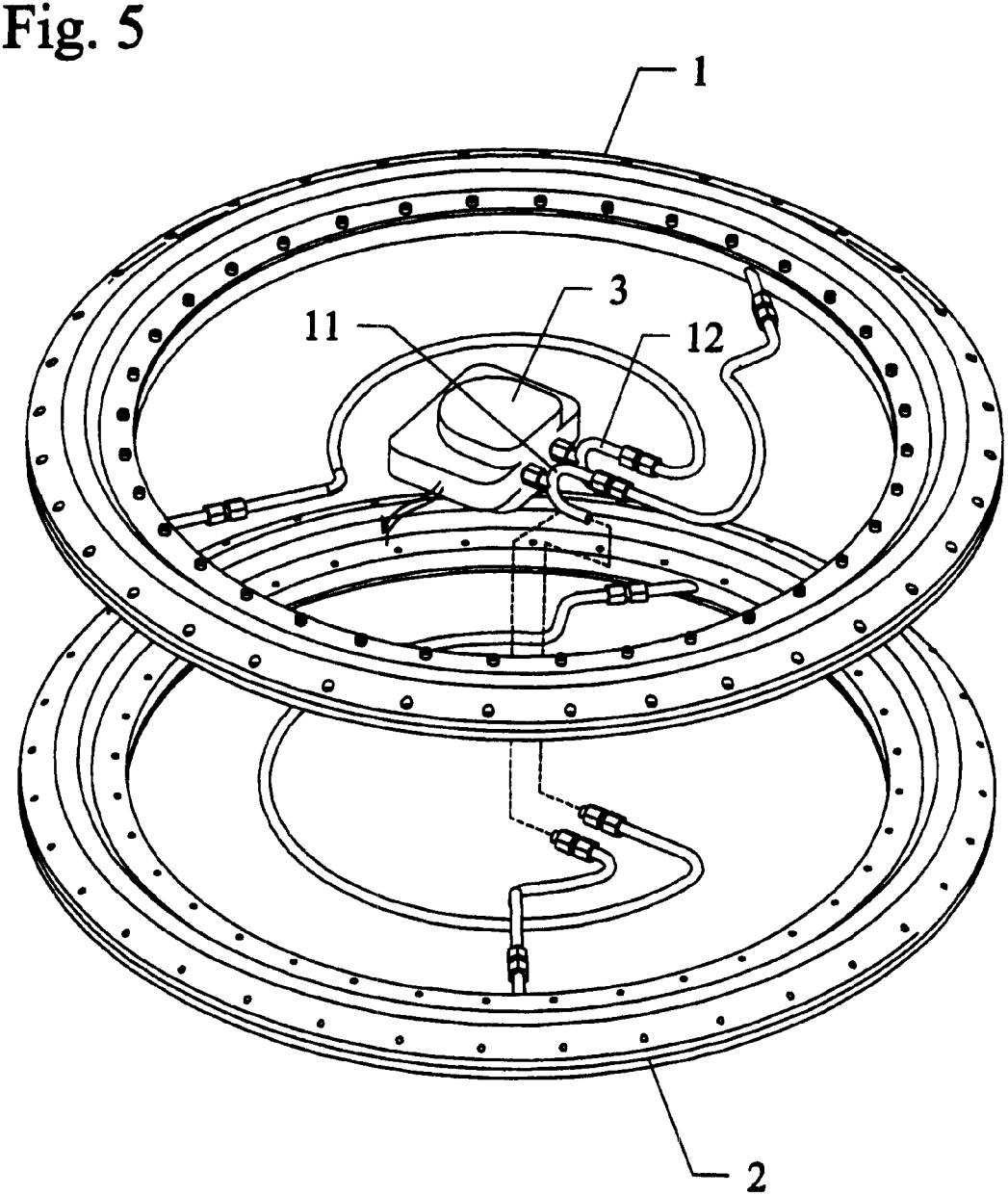
FIG. 5 is an exploded view of the gyrostabilizer with upper and lower tracks separated.
Figure 6:
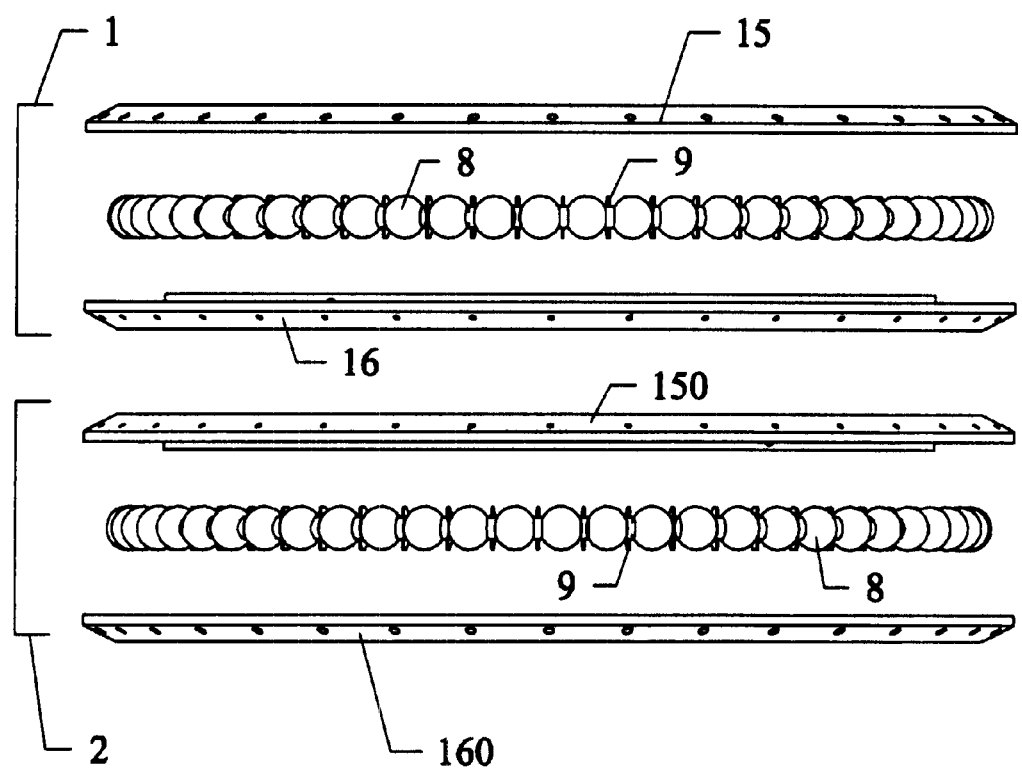
FIG. 6 is an exploded side view of the gyrostabilizer showing steel balls, spacer vanes, upper and lower track assemblies.

FIGS. 5 and 6 are exploded views of the gyrostabilizer assembly. In FIG. 5 the first track 1 and the second track 2 are separated to show how the "Y" connector for the drive lines 11 and the "Y" connector for the return lines 12 are connected to the pump 3. FIG. 6 is a side view of the first track 1 with top cover 15 and bottom cover 16 with a concentric ring of balls 8 separated by spacer vanes 9. The same arrangement is shown for the second track 2 having a top cover 150 separated from the bottom cover 160 that contains a concentric ring of balls 8 separated by: spacer vanes 9.

Figure 7:
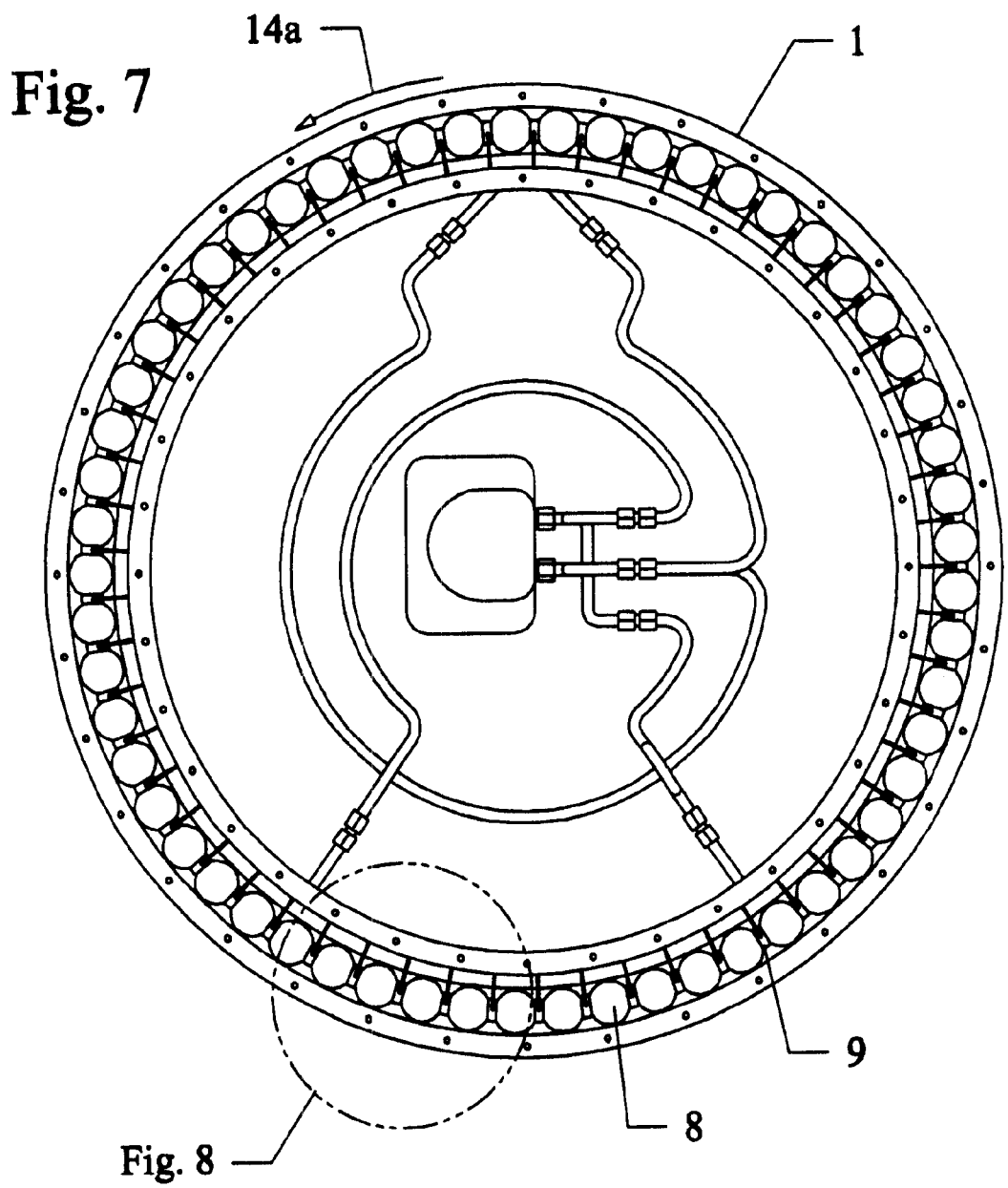
FIG. 7 is a top view of the gyrostabilizer with the top cover of the race removed.

FIG. 7 is a top view of the gyrostabilizer with the top cover of the first track 1 removed. This view provides greater detail on the arrangement of each ball 8 and the spacer vanes 9. The spacer vanes are constructed of a lightweight metal alloy and provide a confined space for each ball to rotate freely thus adding to the momentum of revolution in the direction shown by arrow 14a.

Figure 8:
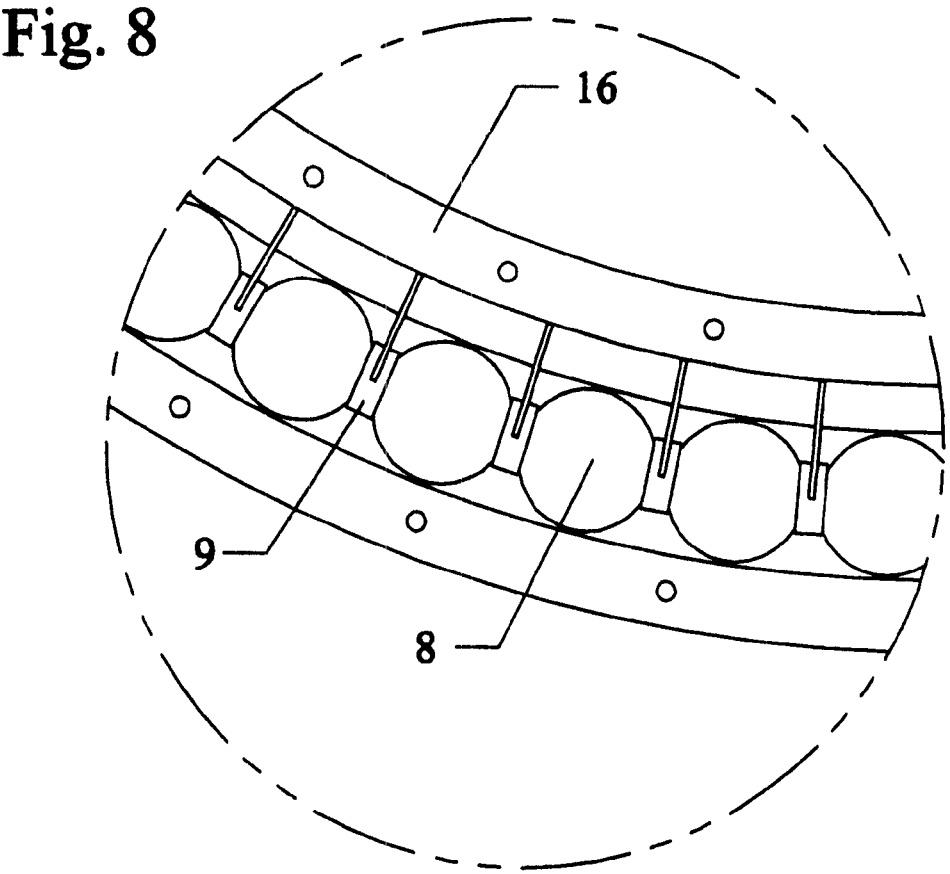
FIG. 8 is an enlarged view of balls and vanes in the lower race.
Figure 9:
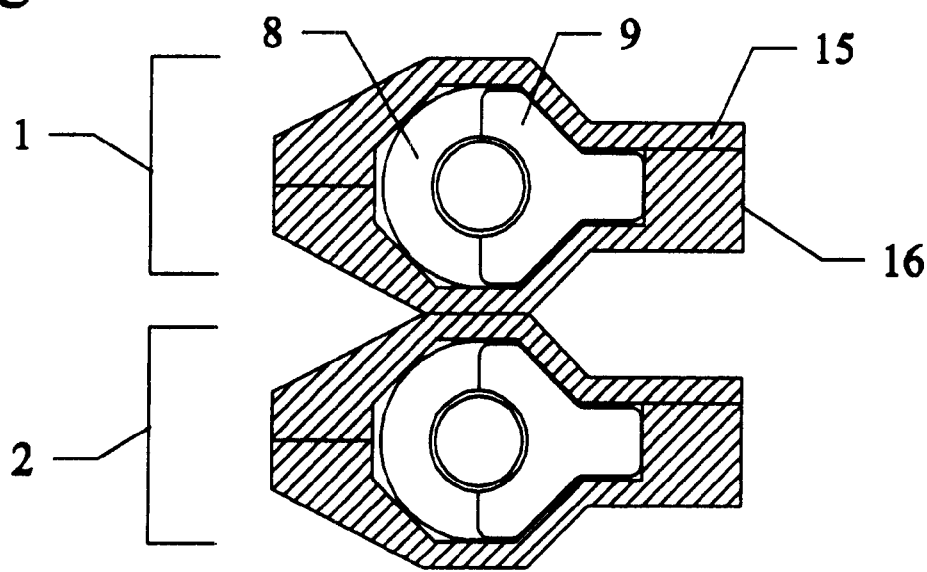
FIG. 9 is an enlarged cross-section of the upper and lower gyro assembly.

FIGS. 8 and 9 are enlarged drawings of sections of FIGS. 7 and 1, respectively. FIG. 8 is a top view of balls 8 and spacer vanes 9 in the bottom cover 16 of the upper track as shown in FIG. 7. In FIG. 9 a cross sectional view of the first track 1 in a stacked arrangement above the second track 2 shows how the top cover 15 fits over the bottom cover 16 forming a leak-free, octagonal shaped track that permits free movement of the ball 8 and the secure positioning of the spacer vane 9 within the cavity formed by the top and bottom covers.

Figure 10:
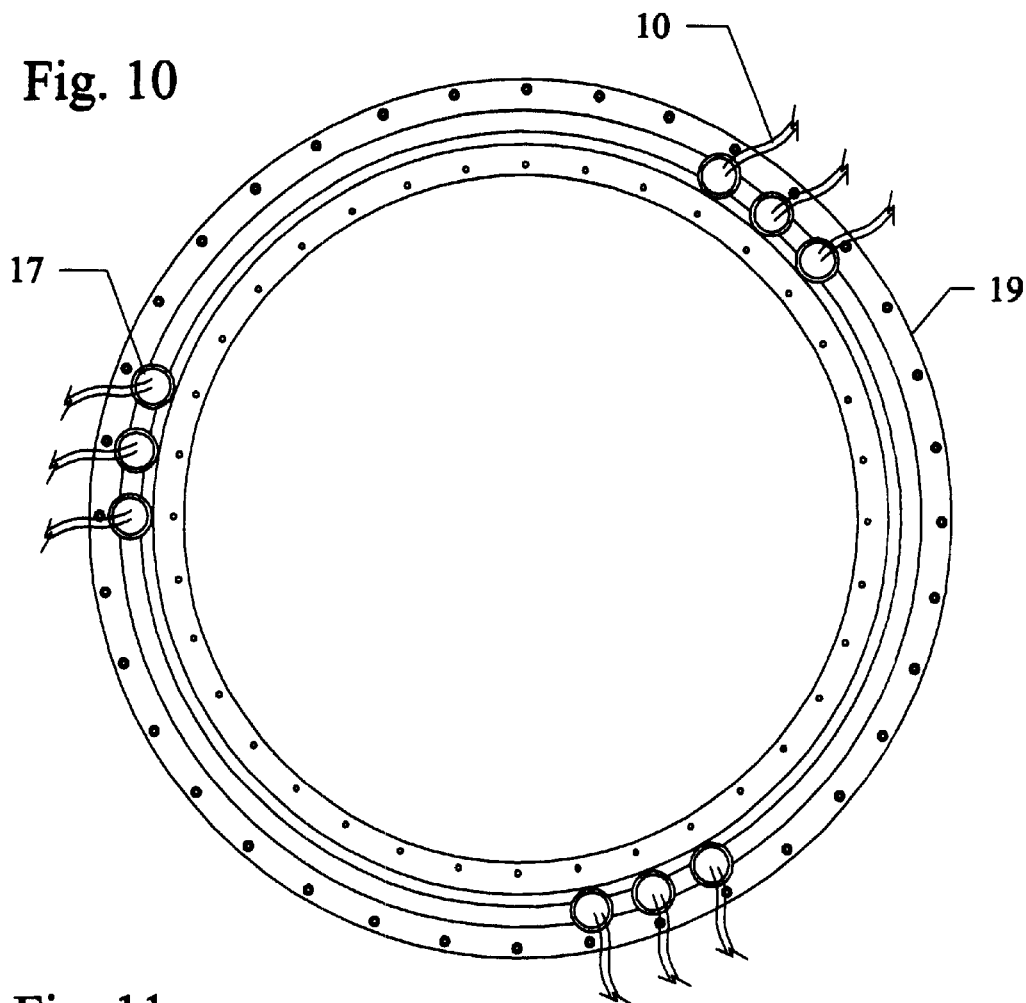
FIG. 10 is a top view of the electromagnet driven gyro.
Figure 11:
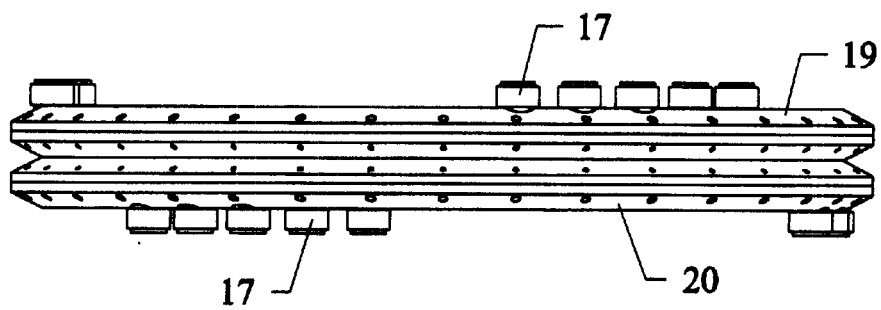
FIG. 11 is a side view of the electromagnet driven gyro showing a series of magnets equally distributed along the upper and lower gyro assembly.

FIG. 10 is a top view of the first track 19 of an electromagnet driven gyro. A series of three electromagnets 17 are positioned strategically above the cavity filled with ferrous and non-ferrous balls (not shown). The electric power source 10 for each magnet is shown. It should be noted that the center of the gyrostabilizer is usable space or can be left void. FIG. 11 is a side view of the assembly propelled by electromagnets. Here a series of five magnets 17 are equally distributed along the first track 19 and the second track 20 of the electromagnet driven gyro.

Figure 12:
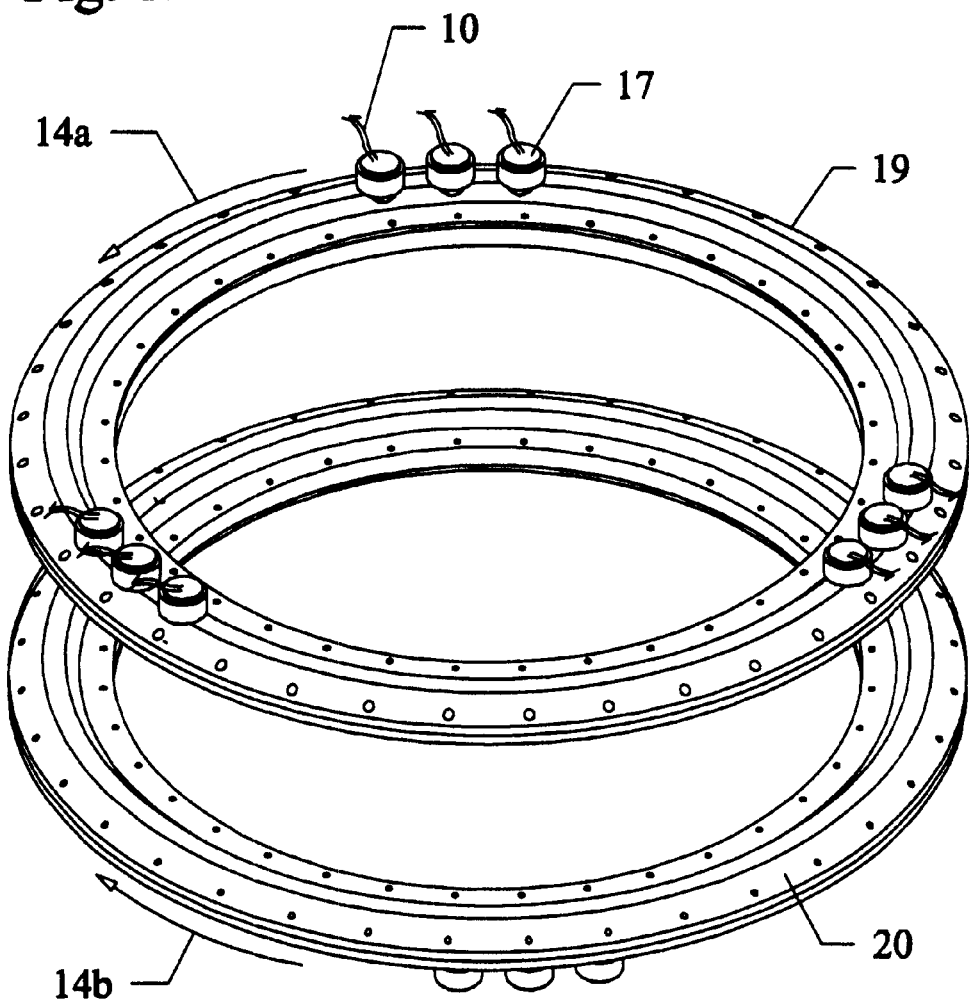
FIG. 12 is an exploded view of the upper and lower tracks of the electromagnet driven assembly.
Figure 13:
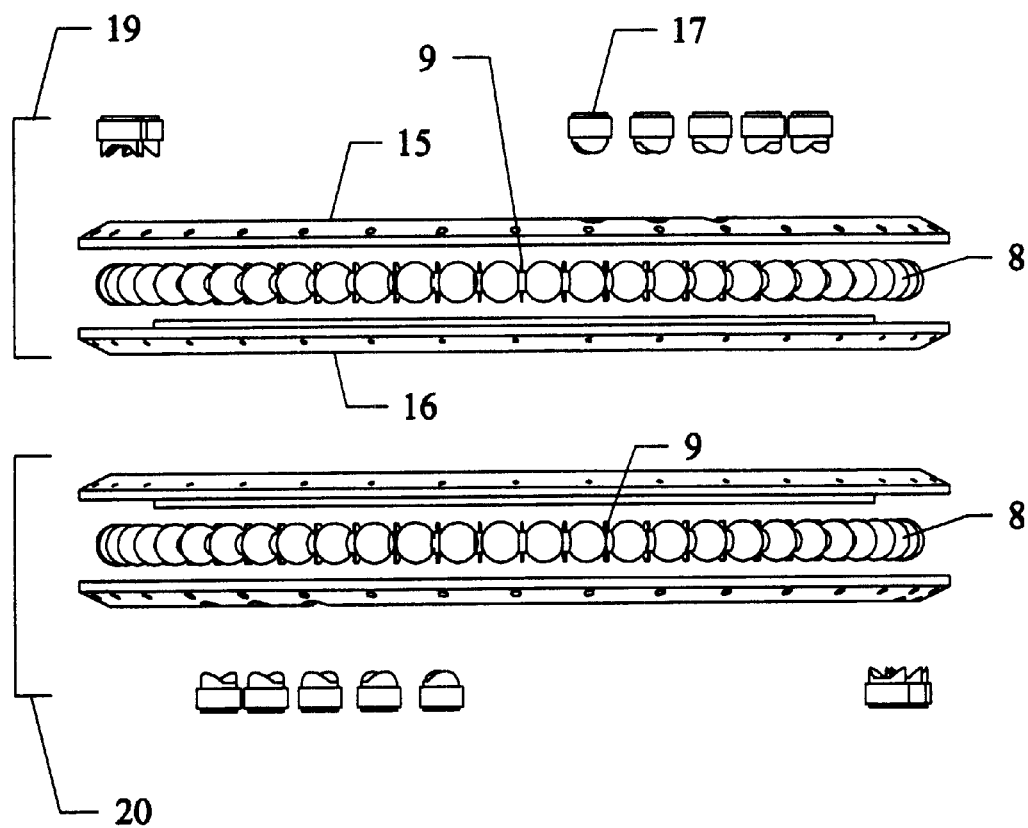
FIG. 13 is an exploded side view of the electromagnet driven gyrostabilizer showing ferrous and nonferrous balls, spacer vanes, upper and lower track assemblies.

FIGS. 12 and 13 are exploded views of electromagnet driven gyrostabilizers. FIG. 12 shows the first track 19 separated from the second track 20 with a strategically positioned series of three electromagnets 17 having power source connections 10. The direction of revolution of balls in each track is as indicated by arrows 14a and 14b. FIG. 13 shows a first track 19 separated from a second track 20 with the top cover 15 apart from the bottom cover 16 showing the concentric ring of balls 8 separated by vanes 9. The balls 8 are propelled in a counter revolving direction by a series of five magnets 17 positioned at equidistant points around the track. It is understood that the first track 19 and the second track 20 have the same arrangement of balls and magnets except that the balls in the first track 19 simultaneously revolve in the opposite direction from the balls in the second track 20. The vanes 9 hold the spacers in place and in the assembled gyro are called, "spacer vanes."

Figure 14A:
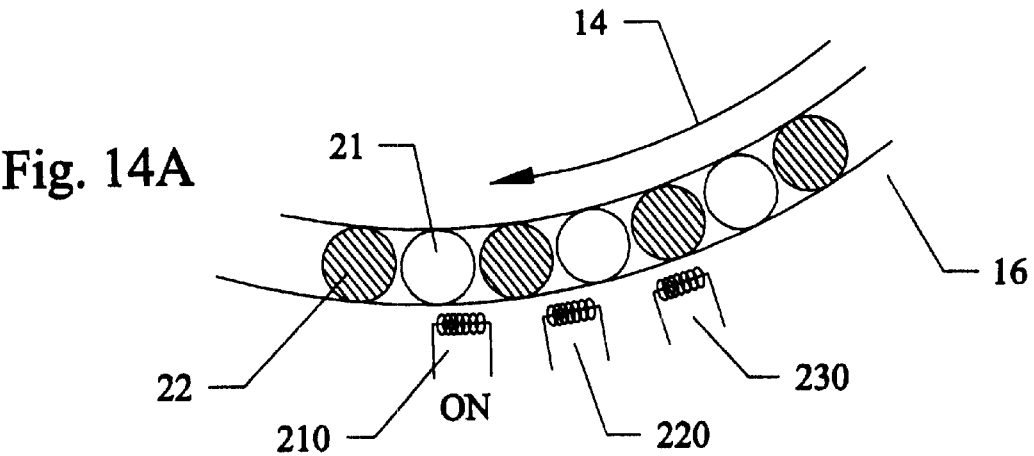
FIG. 14 shows three views of ferrous and nonferrous ball progression propelled by electromagnets (spacer vanes are omitted).
Figure 14B:
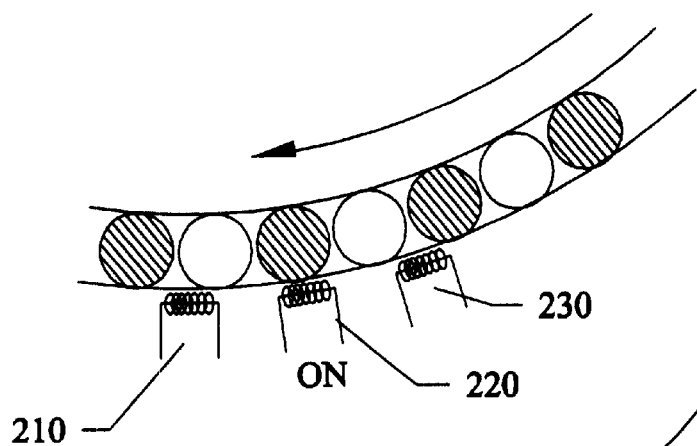
Figure 14C:
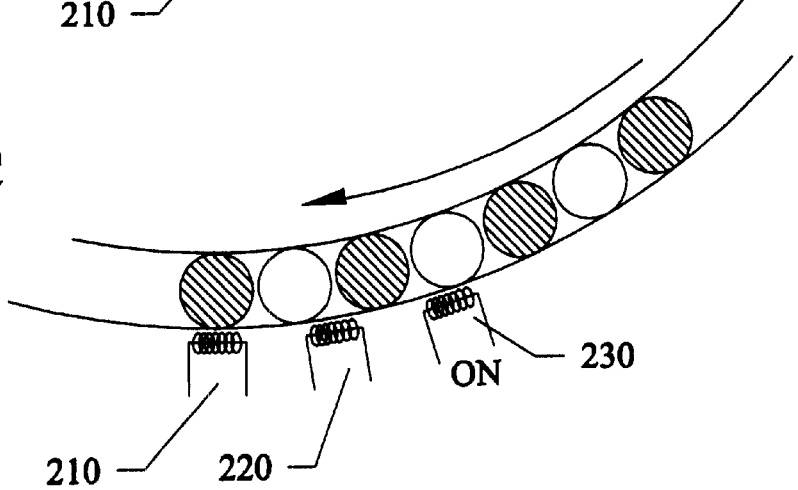

FIG. 14 has three views of nonferrous balls 21 and ferrous balls 22 being propelled by a series of three electromagnets 210, 220, 230 along the bottom cover 16 in the direction 14. For clarity, spacer vanes are not shown in FIG. 14. The non-ferrous balls are of the same density as the ferrous balls. The sequence for switching the magnets on and off is preferably first, middle and last. Thus, FIG. 14A shows movement within the race when the first magnet 210 is turned on to pull a ferrous ball in the desired direction. FIG. 14B shows middle magnet 220 switched on to propel another ferrous ball in the desired direction. Finally, FIG. 14C shows movement that occurs when the last magnet in the series 230 is switched on to support and sustain the movement of all ferrous balls in the desired direction. The ferrous balls 22 cause the nonferrous balls 21 to revolve in the same direction as the ferrous balls propelled by the electromagnets. Also the arrangement of magnets propels the balls in the desired direction.

Figure 15A:
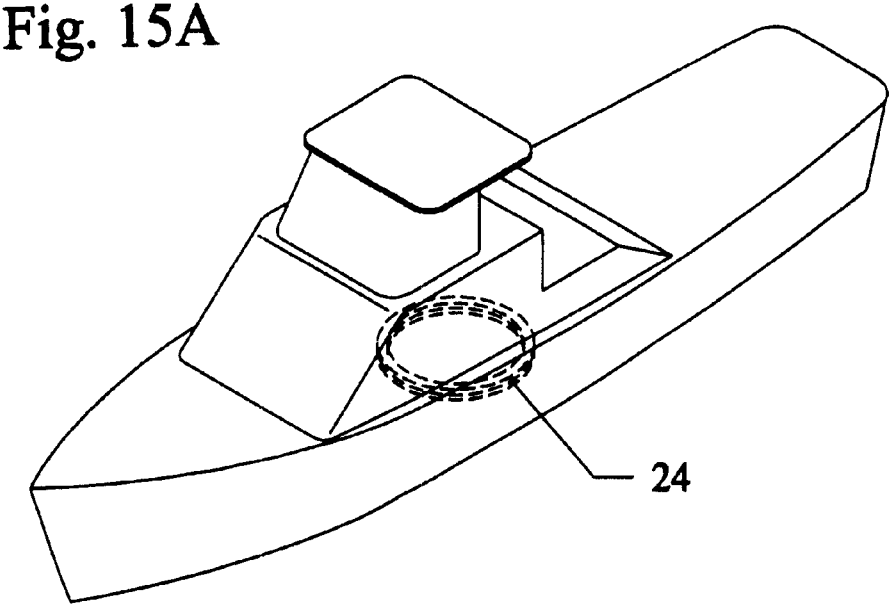
FIG. 15 shows three views of the gyrostabilizer used in a boat.
Figure 15B:
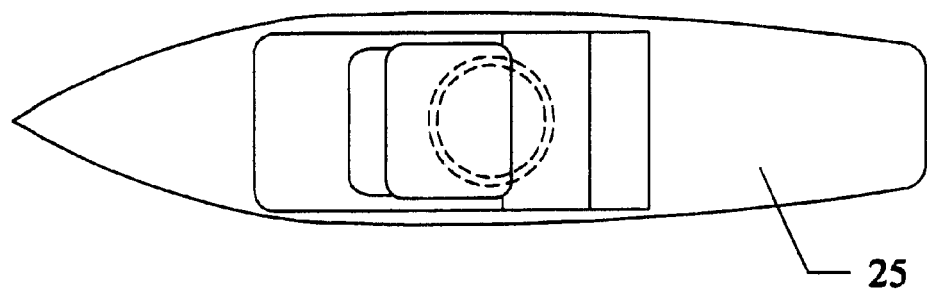
Figure 15C:
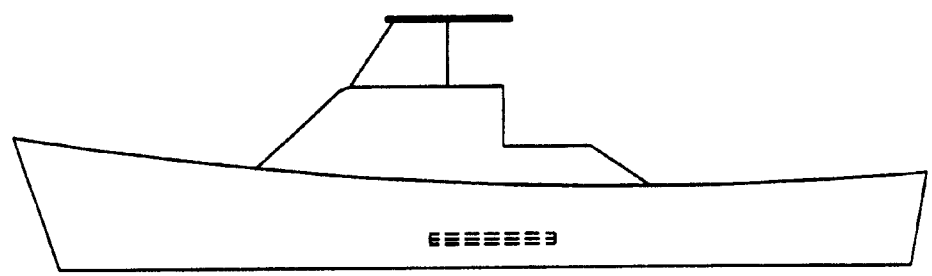
Figure 16B:
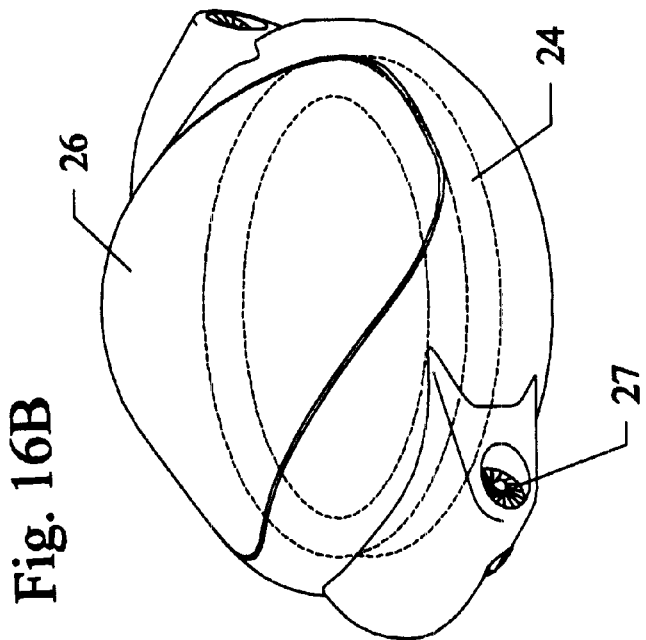
FIG. 16 shows three view of the gyrostabilizer used in a hovercraft.
Figure 16A:
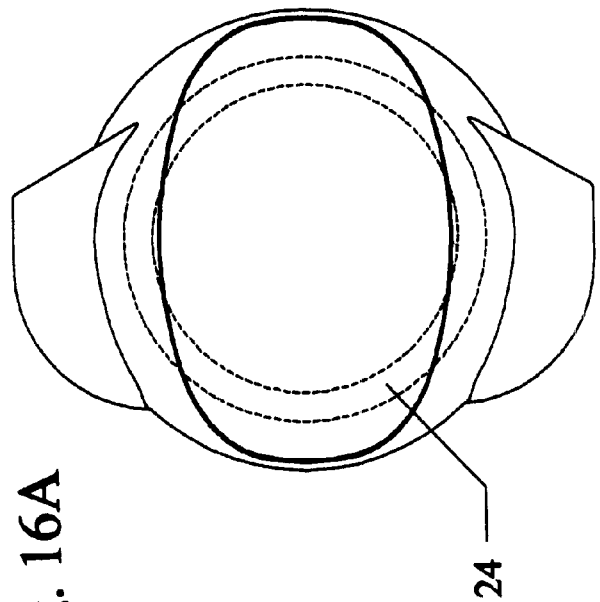
Figure 16C:
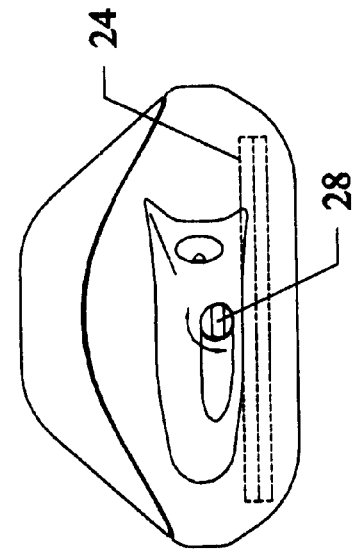
Figure 17A:
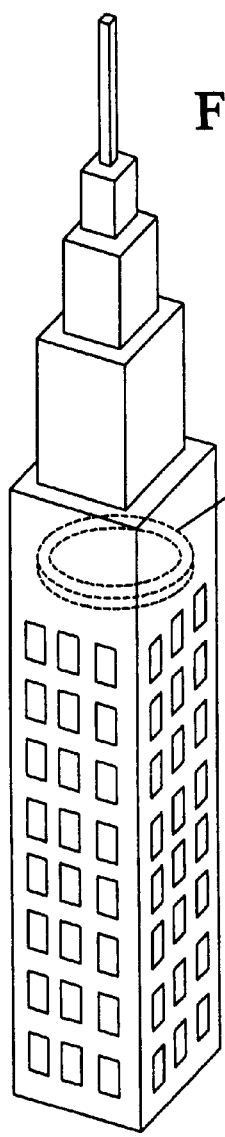
FIG. 17 shows three views of the gyrostabilizer used in a skyscraper.
Figure 17B:
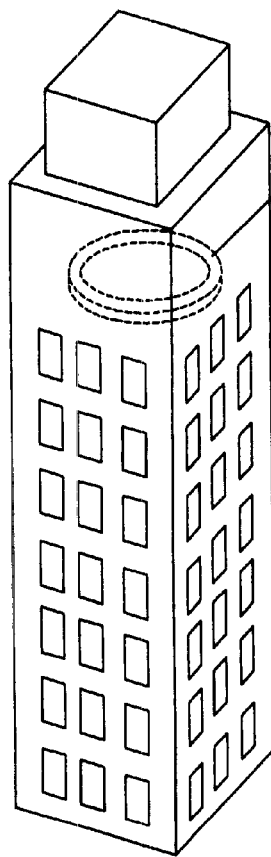
Figure 17C:
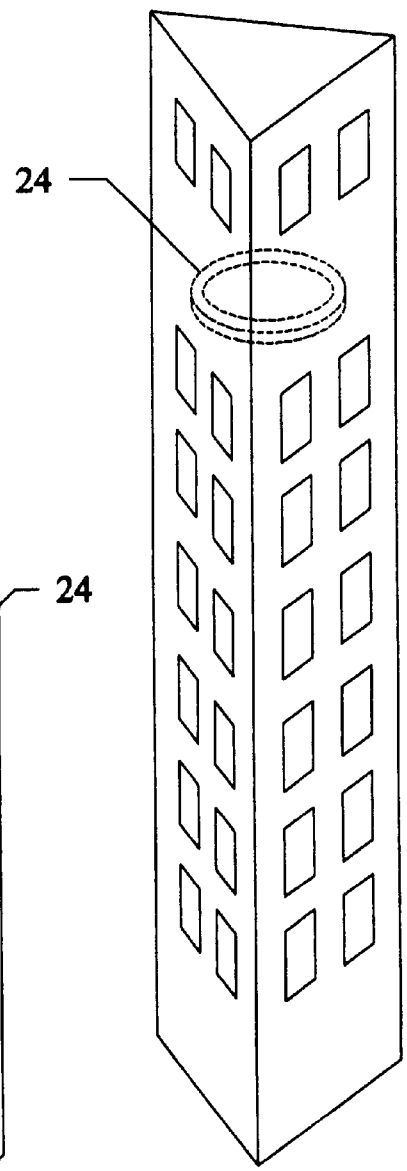

FIGS. 15 through 17 contain illustrations as to how the gyrostabilizer can be used in a variety of vehicles and structures. On a smaller scale each vehicle shown could be designed as a toy. FIGS. 15A, 15B and 15C show a boat 25 with a dual counter revolving gyrostabilizer 24 positioned to revolve horizontally to prevent the boat from pitching upward on take off. FIGS. 16A, 16B and 16C show a hovercraft 26, sometimes called a Vertical Takeoff & Land Craft (VTOL) with turbine intake 27 and a rotating thruster 28 wherein the dotted line configuration in each figure is a gyrostabilizer 24. FIGS. 17A, 17B, and 17C show placement of a gyrostabilizer 24 in a skyscraper to dampen the sway experienced in the higher portion of the structure. The gyrostabilizer is centered horizontally about the central axis of the building in the area subject to the swaying phenomenon.

While the invention has been described, disclosed, illustrated and shown in various terms of certain embodiments or modifications which it has presumed in practice, the scope of the invention is not intended to be, nor should it be deemed to be, limited thereby. Other modifications or embodiments, such as gyrostabilizers in machines, as may be suggested by the teachings herein are particularly reserved especially as they fall within the breadth and scope of the claims here appended.

I claim:

1. A method of forming a gyrostabilizer device for stabilizing vehicles comprising the steps of:
   (a) providing a first moveable mass in a first self-contained circular track;
   (b) providing a second moveable mass in a second self-contained circular track;
   (c) sandwiching the first circular track to the second circular track together and so that the first circular track and the second circular track overlap one another and are each located in planes parallel to one another;
   (d) revolving the first moveable mass in the first circular track in a first direction; and
   (e) simultaneously counter-revolving the second moveable mass in the second circular track in a second direction that is opposite to the first direction, wherein counter revolving effects of the first and the second set of moveable masses assists stabilization of vehicles moving in different directions.

2. The method of stabilizing vehicles as set forth in claim 1 wherein the first and second set of masses include one ferrous ball and one nonferrous ball, which are alternatingly aligned, in the first and the second circular tracks.

3. A gyrostabilizer for vehicles and structures that are moveable in different directions comprising:
   a) a first circular track having a first set of balls and non-ball separator spacers;
   b) a second circular track having a second set of balls and non-ball separator spacers;
   c) first electromagnetic means for electromagnetically moving the first set of balls in the first track in a first direction; and
   d) second electromagnetic means for electromagnetically moving the second set of balls in the second track in a second direction opposite to the first direction, simultaneous to the first set of balls, wherein counter-revolving effects of the balls in their respective tracks assists in stabilizing the vehicles and the structures that move in different directions.

4. The gyrostabilizer as set forth in claim 3 wherein there are non-ball separator spacers for each ball.

5. A shaftless gyrostabilizer for stabilizing moving objects comprising:
   a) a first circular track having a first moveable mass;
   b) a second circular track having a second moveable mass;
   c) means for orientating the first circular track and the second circular track in a sandwiched configuration to each other so that the first and the second tracks overlap one another, and are each located in planes parallel to one another;
   d) first means for moving the first mass in the first track in a first direction;
   e) second means for moving the second mass in the second track in a second direction opposite to the first direction, simultaneous to the first set of balls; and
   f) means for mounting the first circular track and the second circular track in an object without using a shaft or axle through a middle portion of the first and the second circular tracks, wherein gyroscopic effects of the counter revolving masses assists in stabilization of the moving object.

6. The shaftless gyrostabilizer of claim 5 wherein the first moving means and the second moving means each includes: electromagnetic propulsion.

* * * * *

UNITED STATES PATENT AND TRADEMARK OFFICE
CERTIFICATE OF CORRECTION

PATENT NO.     : 6,568,291 B1
DATED          : May 27, 2003
INVENTOR(S)    : William E. Inman It is certified that error appears in the above-identified patent and that said Letters Patent is hereby corrected as shown below:

<u>Column 4,</u>
Lines 43 to 52 should be changed to read:
-- The diameter of the gyrostabilizer of the present invention can range from a few inches for a flying toy, to over ten (10) feet in diameter for larger structures. The rate of revolution can be in the range from 100 to 10,000 revolutions per minute (rpm). In the preferred embodiment wherein a fluid pressure pump is used to propel the gyrostabilizer, an oil pressure pump manufactured by Hi-Speco Corporation can produce pressure in a range from 1500 to 3000 pounds per square inch (psi). Specification for the pump are dependent on the size of the gyro. --

Signed and Sealed this

Eighteenth Day of November, 2003

JAMES E. ROGAN
*Director of the United States Patent and Trademark Office*